United States Patent
CK et al.

(10) Patent No.: US 10,146,832 B2
(45) Date of Patent: Dec. 4, 2018

(54) PREFETCHING FOR COMPUTING AIRLINE ROUTES

(71) Applicants: Pradeep CK, Bangalore Karnataka (IN); Raksha R., Bangalore Karnataka (IN); Venkatesh Ramachar Sanjeeva, Bangalore Karnataka (IN); Nishanth S., Bangalore Karnataka (IN)

(72) Inventors: Pradeep CK, Bangalore Karnataka (IN); Raksha R., Bangalore Karnataka (IN); Venkatesh Ramachar Sanjeeva, Bangalore Karnataka (IN); Nishanth S., Bangalore Karnataka (IN)

(73) Assignee: UNISYS CORPORATION, Blue Bell, PA (US)

( * ) Notice: Subject to any disclaimer, the term of this patent is extended or adjusted under 35 U.S.C. 154(b) by 306 days.

(21) Appl. No.: 15/016,373

(22) Filed: Feb. 5, 2016

(65) Prior Publication Data
US 2017/0228424 A1 Aug. 10, 2017

(51) Int. Cl.
*G06F 17/30* (2006.01)

(52) U.S. Cl.
CPC .... *G06F 17/30457* (2013.01); *G06F 17/3048* (2013.01)

(58) Field of Classification Search
CPC . G06Q 10/02; H04L 67/2847; H04L 29/0881; G06F 2212/6022; G06F 2212/6026; G06F 2212/6028; G06F 12/0862; G06F 9/30047; G06F 9/3814; G06F 17/30457; G06F 17/3048

USPC .............................. 707/618, 706, 736; 705/5
See application file for complete search history.

(56) References Cited

U.S. PATENT DOCUMENTS

| | | | | |
|---|---|---|---|---|
| 6,067,565 A * | 5/2000 | Horvitz | ............. | G06F 17/30861 707/E17.107 |
| 6,385,641 B1 * | 5/2002 | Jiang | ........................ | H04L 29/06 709/203 |
| 6,993,591 B1 * | 1/2006 | Klemm | ................ | H04L 67/2847 707/999.002 |
| 7,130,890 B1 * | 10/2006 | Kumar | ................ | H04L 67/2847 709/218 |
| 8,667,224 B1 * | 3/2014 | Yu | ........................ | G06F 12/0862 711/137 |
| 2005/0108069 A1 * | 5/2005 | Shiran | .................... | G06Q 10/02 705/5 |
| 2010/0161756 A1 * | 6/2010 | Lewis | ................ | H04N 7/17318 709/217 |
| 2015/0237160 A1 * | 8/2015 | Holden | ............... | H04L 67/2847 709/202 |

* cited by examiner

*Primary Examiner* — Dennis Truong (57) ABSTRACT

Airline route information may be pre-fetched and cached in a routings engine to improve response time of the routings engine to generate routes from an origin to a destination location. For example, a method may include receiving, at a routings engine from an airline reservation system, a request for first airline routes between an origin and a destination based on specified route parameters; storing, by the routings engine, the request in a historical record of requests; fetching, by the routings engine, first airline routes matching the origin, the destination, and the specified route parameters; and pre-fetching, by the routings engine, second airline routes based, at least in part, on the historical record of requests.

18 Claims, 8 Drawing Sheets

PREFETCHING FOR COMPUTING AIRLINE ROUTES

FIELD OF THE DISCLOSURE

The instant disclosure relates to airline management. More specifically, this disclosure relates to computing of airline routes.

BACKGROUND

Figure 1A:
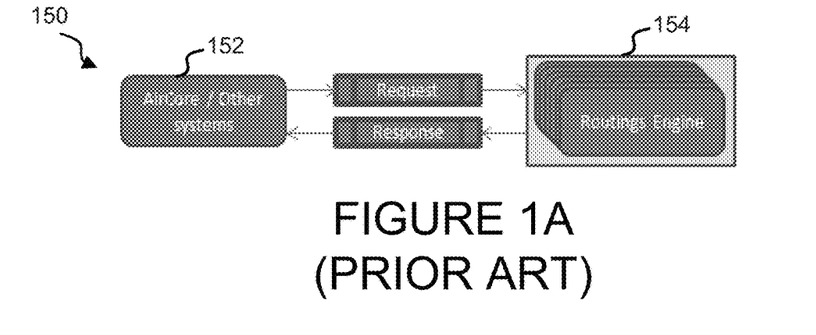
FIG. 1A is a conventional system for responding to route requests.

Identifying routes between an origin and a destination is an important part of routing a package or seating a passenger. One system for identifying routes is shown in FIG. 1A. A system 150 may include an AirCore or other computing system 152 that accesses a routings engine 154. For example, a computing system 152 may generate a request for routes between San Francisco and New York City at a particular time and date. The routings engine 154 searches a listing of flights, such as stored in a database, and returns a response containing a listing of flight paths that match San Francisco and New York City for approximately the particular time and date.

The number of available routes from the origin to the destination can be nearly endless when considering more than only direct routes. For example, a trip from San Francisco to New York City can be flown directly, or can be flow through Chicago, Dallas, Nashville, Seattle, etc. The permutations through possible routes from the origin to the destination, even with modern computing systems, may take several seconds to traverse and generate a list for display to a user. These calculations, particularly during peak times when many users are accessing the computing system to search routes, may cause unpleasant delays for users of the computing system for determining flight routes.

One conventional solution to enhancing the experience of a user searching for routes is to cache certain results. A first query to the routings engine 154 for flights from San Francisco to New York City may take a long period of time, such as several seconds, to execute. The user is then provided the results in a response from the Routings Engine. These results may also be cached in memory. A second query to the routings engine 154 for the same San Francisco to New York City path at the same time and date may return results from the cache, and thus be returned to the user in a response in a much shorter period of time, such as fractions of a second. One conventional application of caching in the routings engine is shown in FIG. 1B.

Figure 1B:
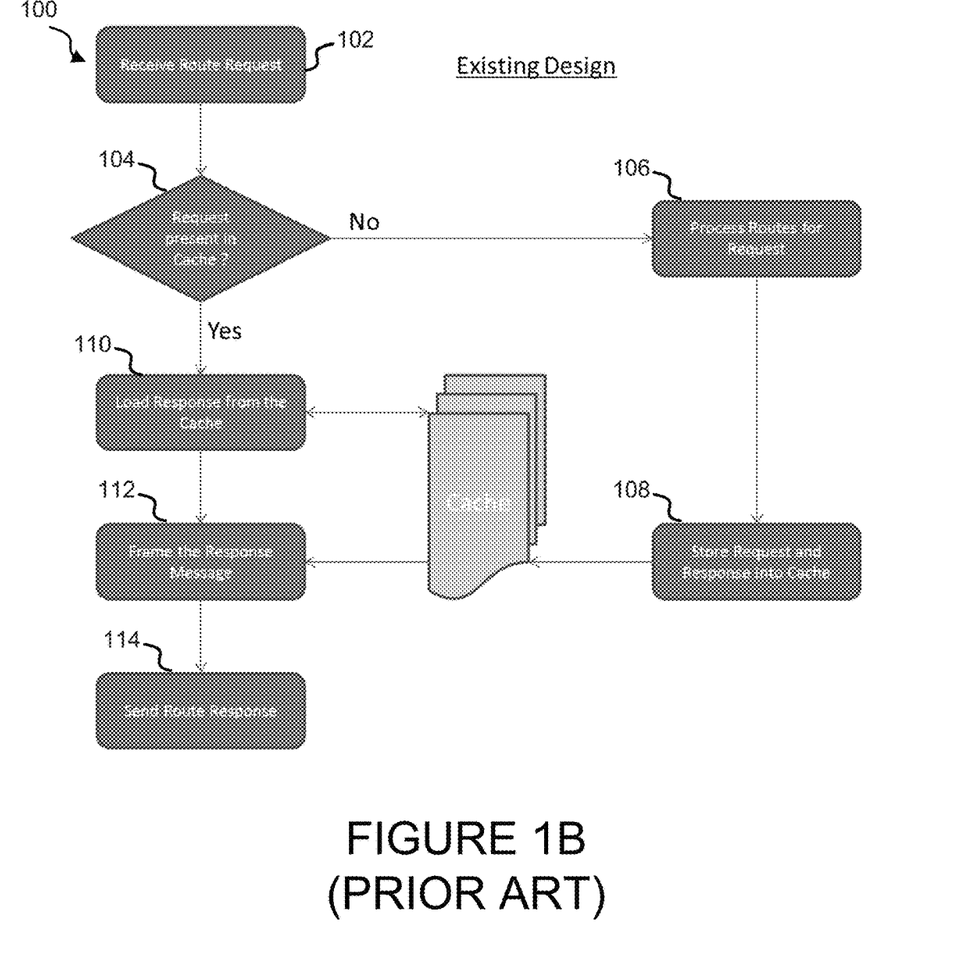
FIG. 1B is a flow chart illustrating caching of flight routs in a routing engine.

FIG. 1B is a flow chart illustrating caching of flight routes in a routing engine. A method 100 begins with receiving a route request at block 102 and determining whether the results of the response are present in the cache at block 104. If so, the response is loaded from the cache at block 110, the response framed in a response message at block 112, and the response sent at block 114. If the request is not present in the cache at block 104, then the method 100 processes routes for the request at block 106, stores the request and response into the cache at block 108, frames the response in a message at block 112, and sends the response at block 114.

Caching may improve the response time of repeated, identical requests to the routings engine. Although caching improves the response time in some situations, the first user making a request that is not stored in cache must still wait a relatively long duration of time before receiving a response. This long duration of time creates an unpleasant experience for the user.

SUMMARY

A user experience for searching and identifying flight routes from an origin to a destination location may be enhanced by providing pre-fetching of flight routes based on predictions of user requests for particular flight routes. In one embodiment, a server may be configured to perform pre-fetching of flight routes between predicted origin and destination locations and store the pre-fetched flight routes in a cache. When a user queries for flight routes between an origin and destination, the results may be retrieved from the cache, if available, and the user provided a much quicker response to the query. The pre-fetching of flight routes may pre-fetch predicted flights routes based on historical data regarding queries being executed against a database of flight routes.

According to one embodiment, a method may include the steps of receiving, at a routings engine from an airline reservation system, a request for first airline routes between an origin and a destination based on specified route parameters; storing, by the routings engine, the request in a historical record of requests; fetching, by the routings engine, first airline routes matching the origin, the destination, and the specified route parameters; and pre-fetching, by the routings engine, second airline routes based, at least in part, on the historical record of requests.

According to another embodiment, a computer program product may include a non-transitory medium having instructions, when executed by a processor of a computing system, cause the processor to perform the steps of receiving, at a routings engine from an airline reservation system, a request for first airline routes between an origin and a destination based on specified route parameters; storing, by the routings engine, the request in a historical record of requests; fetching, by the routings engine, first airline routes matching the origin, the destination, and the specified route parameters; and pre-fetching, by the routings engine, second airline routes based, at least in part, on the historical record of requests.

According to yet another embodiment, an apparatus may include a processor and a memory coupled to the processor. The processor may be configured to perform the steps of receiving, at a routings engine from an airline reservation system, a request for first airline routes between an origin and a destination based on specified route parameters; storing, by the routings engine, the request in a historical record of requests; fetching, by the routings engine, first airline routes matching the origin, the destination, and the specified route parameters; and pre-fetching, by the routings engine, second airline routes based, at least in part, on the historical record of requests.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 2:
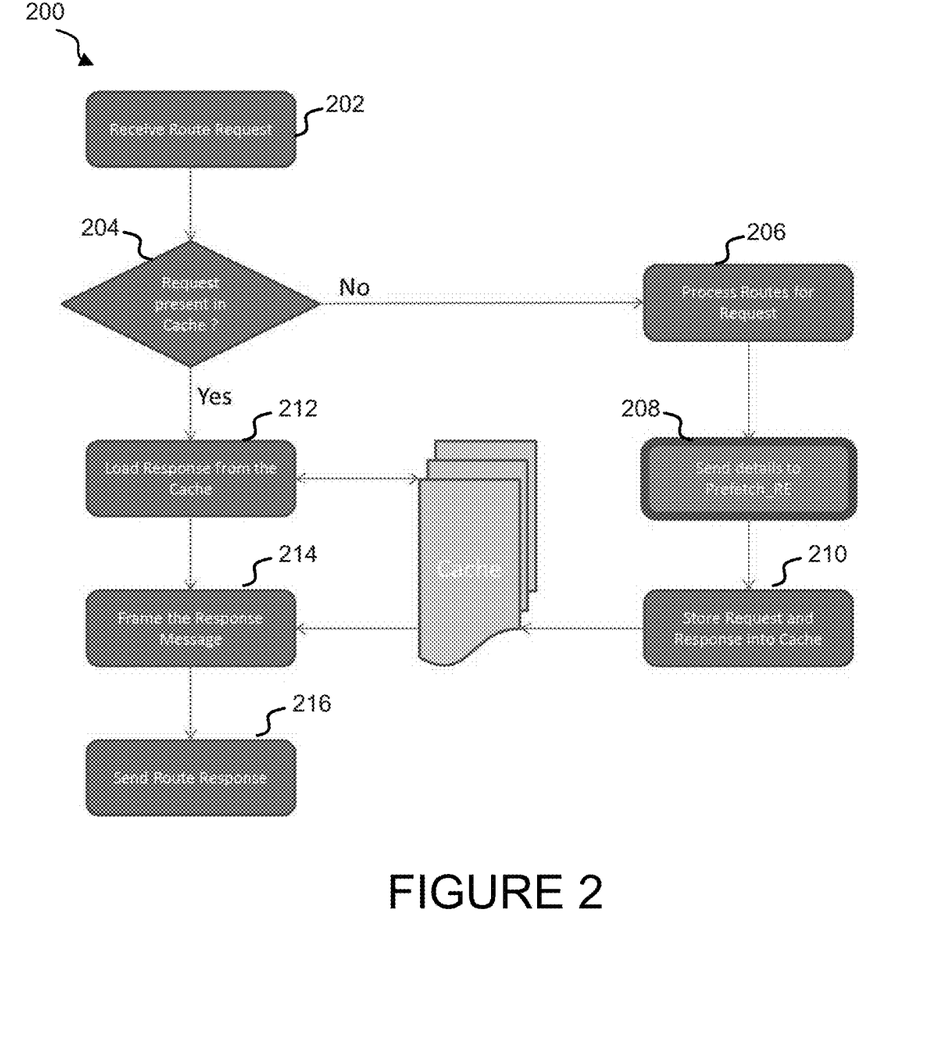
FIG. 2 is a flow chart illustrating operation of a routings engine with pre-fetching enabled when responding to a route request according to one embodiment of the disclosure.

FIG. 2 is a flow chart illustrating operation of a routings engine with pre-fetching enabled when responding to a route request according to one embodiment of the disclosure. A method 200 begins with receiving a route request at block 202 and determining whether the results of the response are present in the cache at block 204. If so, the response is loaded from the cache at 212, the response framed in a response message at block 214, and the response sent at block 216. If the request is not present in the cache at block 204, then the method 200 processes routes for the request at block 206. The route request may then be sent to a pre-fetch engine at block 208, which may be integrated with the routings engine, where the pre-fetch engine may store the request and use the set of stored requests to predict future route requests. In one embodiment, a route request may only be forwarded to the pre-fetch engine if processing the request at block 206 exceeded a predetermined threshold amount of time. In this method of operation, only long-running route requests are pre-fetched. For example, any route request that takes longer than one second to process at block 206 may be forwarded to the pre-fetching engine. At block 210, the request and response may be stored into the cache. Then, at block 214, the method 200 may include framing the response in a message, and sending the response at block 216.

Figure 3:
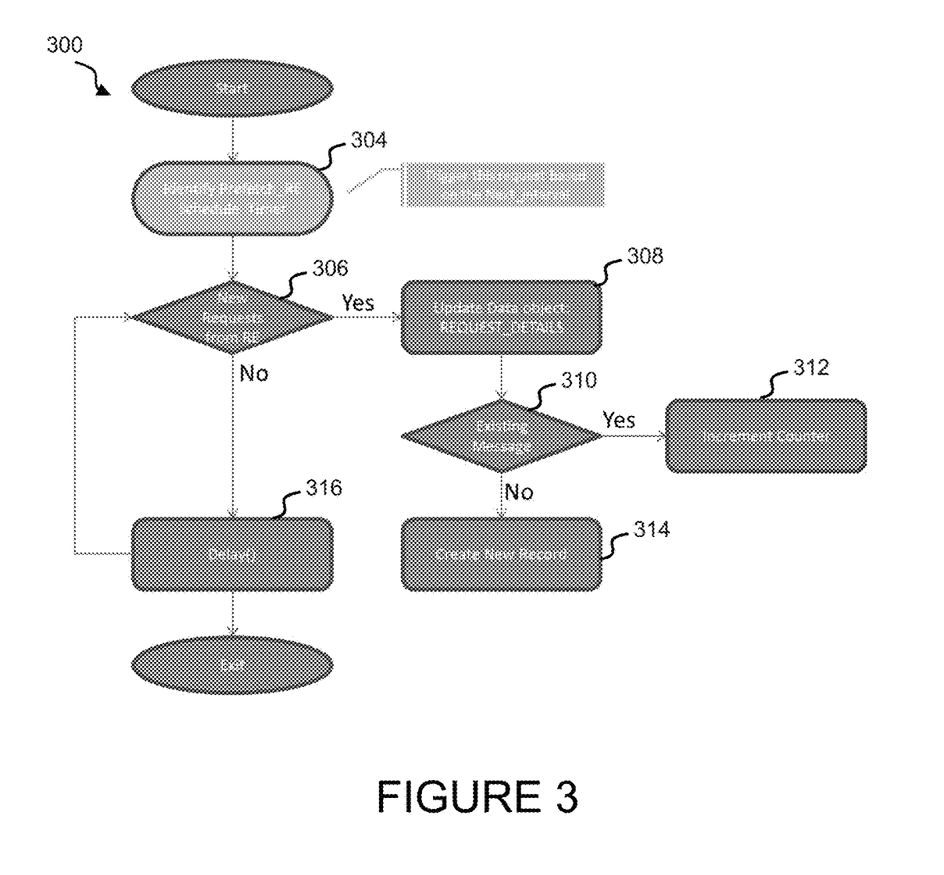
FIG. 3 is a flow chart illustrating a pre-fetching operation according to one embodiment of the disclosure.

The route requests may be sent to the pre-fetch engine and processed by the pre-fetch engine in parallel with responding to the route requests. In one embodiment, the pre-fetching engine may process requests at certain intervals, such as intervals defined by a scheduled timer. FIG. 3 is a flow chart illustrating a pre-fetching operation according to one embodiment of the disclosure. A method 300 may begin at block 304 with a trigger even being received to process received route requests. At block 306, the pre-fetch engine determines if any new requests have been received from the routings engine (RE). If not, the method 300 proceeds to block 316 to delay for a duration of time and return to block 306 to check for new requests. When new requests are identified at block 306, then the method 300 continues to block 308 to update a data object to include the received request. At block 310, it is determined whether the received request matches a previously-received request. If so, a counter for the request is incremented at block 312. If not, a new record for the request is created at block 314.

Figure 4:
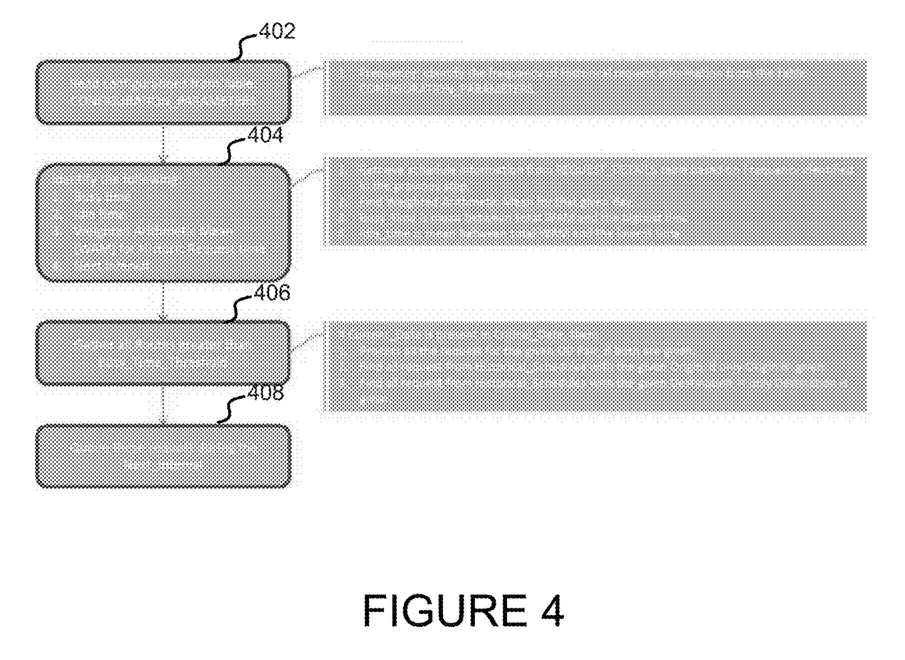
FIG. 4 is a flow chart illustrating a method of pre-fetching at specific times according to one embodiment of the disclosure.

Additional details for one embodiment of pre-fetching route data is described in FIG. 4. FIG. 4 is a flow chart illustrating a method of pre-fetching at specific times according to one embodiment of the disclosure. At block 402, a configuration may be read, such as from a database table named CONFIGURATION_PARAMETERS. For example, a frequency value of historical request information may be read from the configuration. At block 404, the pre-fetch engine may identify one or more of a busy time, an idle time, a weighted arithmetic mean (WAM) for historical request time, and a next interval. For example, schedule information may be retrieved from the REQUEST_DETAILS table of FIG. 3 based on a frequency identified at block 402. In another example, a busy time value may be identified as a mean between a total WAM and a highest time, and an idle time value may be identified as a mean between the total WAM and a lowest time. Then, at block 406, all route requests whose response time greater than a busy time threshold value may be collected.

The busy time threshold value may set a value that indicates that a particular route request is predicted to be repeated. For example, if a busy time threshold value is set to four and the historical records show five requests made for San Francisco to New York City routes over a certain duration of time, then the request for San Francisco to New York City routes may be marked for pre-fetching at the next interval by queueing the request at block 408. The busy time threshold value may be predetermined and set by an administrator or may be adaptive and set to, for example, a value to cache a certain percentage of requests, such as top 25% busiest requests.

While collecting routes at block 406, a pre-fetch engine may determine whether a current date is present in a critical date and may execute a process when the current date is present in the critical date. In one embodiment, the critical date may be obtained from a DB table named CRITICAL_DATE. This database may indicate that on a given date, one can expect increase in travel request from a given origin and/or to a given destination. Additional details are described below. The process may include processing all requests for a certain origin-destination (OD) pair, if both are given: processing all requests from the historical record of route requests with the given origin, if only an origin is given; and/or processing all requests from the historical record of route requests with the given destination, if only the destination is given.

All route requests identified as candidates for pre-fetching during blocks 402, 404, and 406 may be queued at block 408 for pre-fetching at a next interval. The next interval value may specify when to execute the route requests to pre-fetch and store results in the cache. The next interval value may be selected to be a time when the routings engine (RE) is known to be operating well below its capacity to respond to route requests. Thus, the data for certain predicted routes may be pre-fetched and stored in a cache when the routings engine is not busy. This pre-fetching may create little negative impact to the users of the routing engine while providing increased response to frequently performed route requests.

In one embodiment, route requests received during a busy time, such as a time period when demand on the routings engine is above a mean between a total weighted arithmetic mean and a highest load, may be identified and processed during an idle time, such as a time period when demand on the routings engine is below a mean between a total weighted arithmetic mean and a lowest load.

In another embodiment, predictions for route requests that are pre-fetched may be based on the day. For example, route requests may be analyzed to determine common origin-destination pairs requests on Mondays and pre-fetch route requests for those common origin-destination pairs on Monday. In one example situation, many flyers may be returning home from vacation cities on Mondays and thus route requests specifying non-vacation oriented cities may be cached.

In a further embodiment, unique days, such as holidays that fall on different days each year, may be scheduled into the pre-fetch engine and used to select routes for pre-fetching. For example, the American Labor Day holiday may fall on a different date each year, but the server may be programmed with the dates of labor days in the future and past, such that the pre-fetch engine may predict likely flights around such holidays or other special days.

Figure 5:
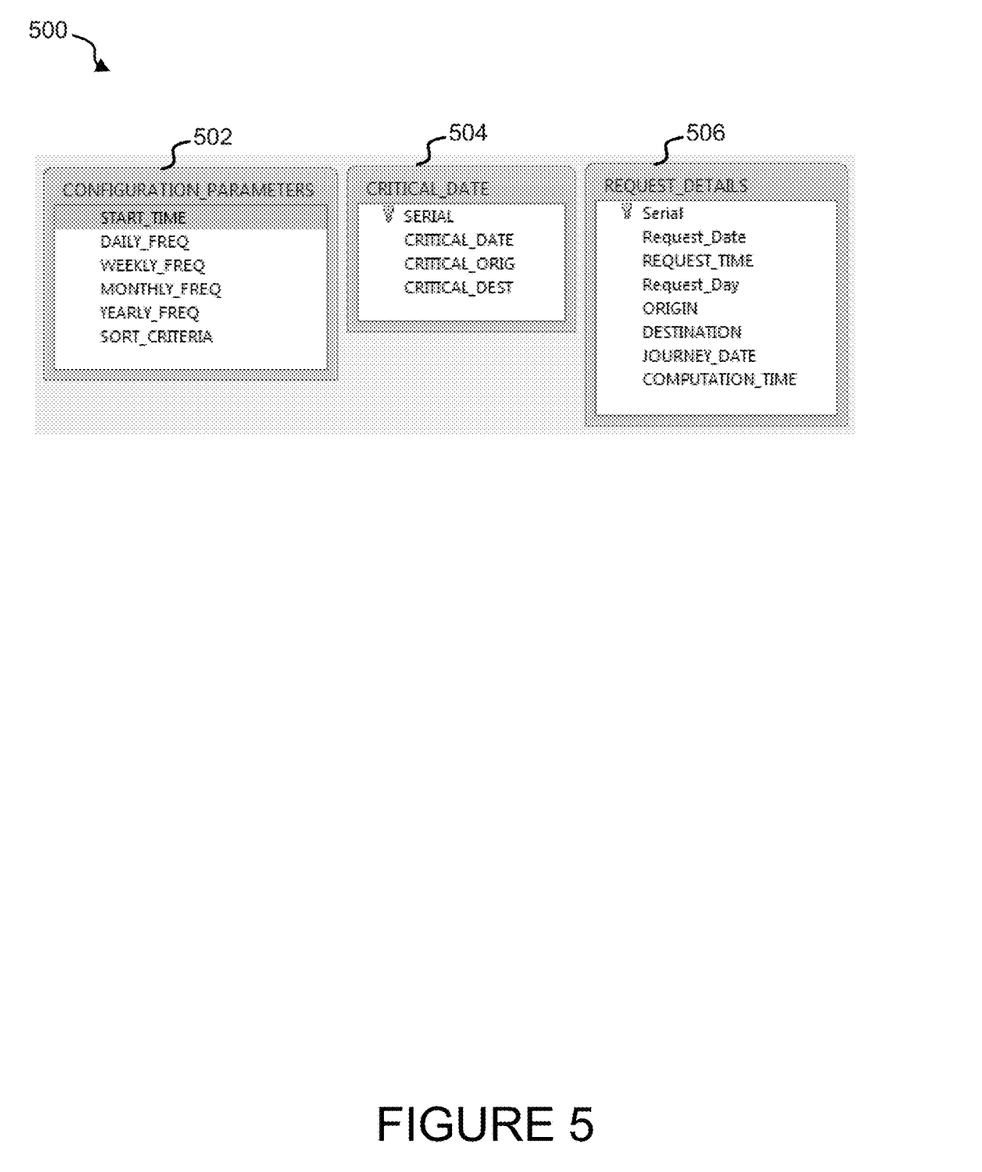
FIG. 5 is a block diagram illustrating a database table for recording route requests for use during pre-fetching according to one embodiment of the disclosure.

Example database tables for storing data discussed above with reference to FIG. 3 and FIG. 4 are shown in FIG. 5. FIG. 5 is a block diagram illustrating a database table for recording route requests for use during pre-fetching according to one embodiment of the disclosure. One table 502, such as a CONFIGURATION_PARAMETERS table, may include fields for start time, daily frequency, weekly frequency, monthly frequency, yearly frequency, and/or sort criteria. The daily frequency, weekly frequency, monthly frequency, and yearly frequency values may be Boolean values indicating a schedule for re-evaluating which routes to pre-fetch. For example, if the weekly frequency value is set to TRUE, then the pre-fetch engine may re-evaluate each week the list of route requests to pre-fetch.

Another table 504, such as a CRITICAL_DATE table, may include fields for serial, critical date, critical origin, and/or critical destination. In one embodiment, this table may be entered by a user based on experience and/or automatically generated based on statistical approaches. For example, during the Christmas holiday season there may be an increase in bookings to Orlando, Fla. on December 22 and 23 indicated by entries: CRITICAL_DATE{'1', 22 Dec. 2014, *, MCO}, CRITICAL_DATE{'1', 23 Dec. 2014, *, MCO}. Because the 22nd and 23rd are important travel dates, it may be anticipated that these requests could come at least a few weeks earlier, such as from December 1 onward. Thus, the system may be updated with requests for routes required on 22nd and 23rd from December 1$^{st}$ itself by prefetching each day from 1st until 23rd. Similarly, prefetch may obtain routes from Orlando, Fla. on 26th December such as with an entry: CRITICAL_DATE{'1', 26 Dec. 2014, MCO, *}. Other examples of known events for prefetching may include, for example, football league events.

A further table 506, such as a REQUEST_DETAILS table, may include fields for serial, request date, request time, origin, destination, journey date, and computation time. The table 506 may, for example, store the historical records of a selection of route requests received at the routings engine. Each request may include an identifier value (serial), the request date and time, the origin and destination of the request, route parameters such as journey date, and a computation time of when results for that route request were stored in the cache. The computation time field may allow, for example, the pre-fetch engine to delete stale route response computations from the cache.

Figure 6:
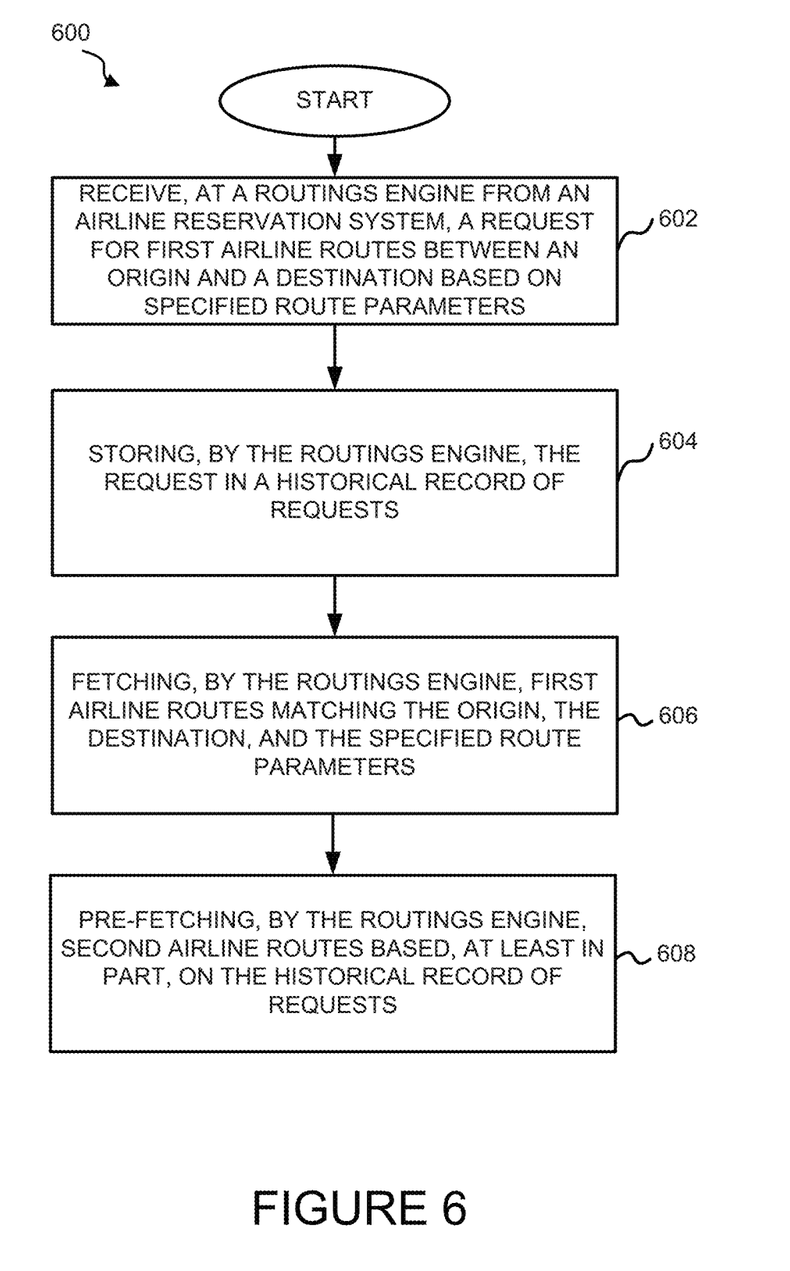
FIG. 6 is flow chart illustrating a method of pre-fetching routes according to one embodiment of the disclosure.

FIG. 6 is flow chart illustrating a method of pre-fetching routes according to one embodiment of the disclosure. A method 600 begins at block 602 with receiving, at a routings engine from an airline reservation system, a request for first airline routes between an origin and a destination based on specified route parameters. Then at block 604, the method 600 continues with storing, by the routings engine, the request in a historical record of requests. At block 606, the method 600 continues with fetching, by the routings engine, first airline routes matching the origin, the destination, and the specified route parameters. Then, at block 608, the method 600 continues with pre-fetching, by the routings engine, second airline routes based, at least in part, on the historical record of requests.

Figure 7:
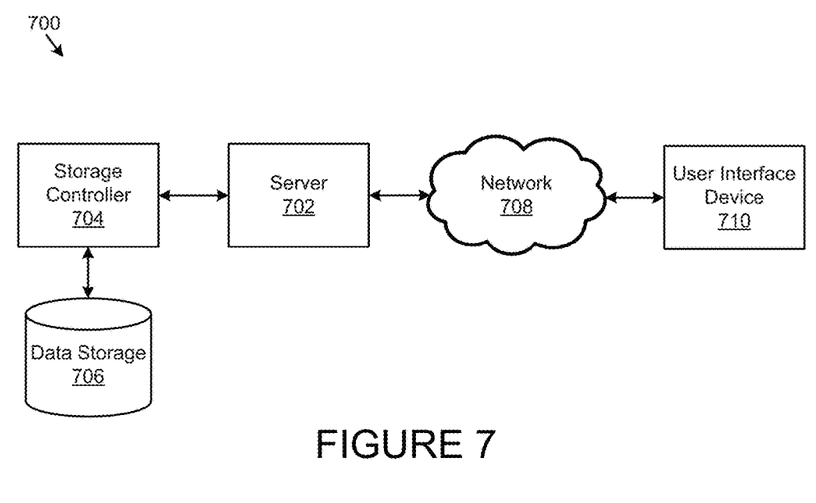
FIG. 7 is a block diagram illustrating a computer network according to one embodiment of the disclosure.

FIG. 7 illustrates one embodiment of a system 700 for an information system, including a system for responding to flight requests. The system 700 may include a server 702, a data storage device 706, a network 708, and a user interface device 710. In a further embodiment, the system 700 may include a storage controller 704, or storage server configured to manage data communications between the data storage device 706 and the server 702 or other components in communication with the network 708. In an alternative embodiment, the storage controller 704 may be coupled to the network 708.

In one embodiment, the user interface device 710 is referred to broadly and is intended to encompass a suitable processor-based device such as a desktop computer, a laptop computer, a personal digital assistant (PDA) or tablet computer, a smartphone, or other mobile communication device having access to the network 708. In a further embodiment, the user interface device 710 may access the Internet or other wide area or local area network to access a web application or web service hosted by the server 702 and may provide a user interface for controlling the information system.

The network 708 may facilitate communications of data between the server 702 and the user interface device 710. The network 708 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 8:
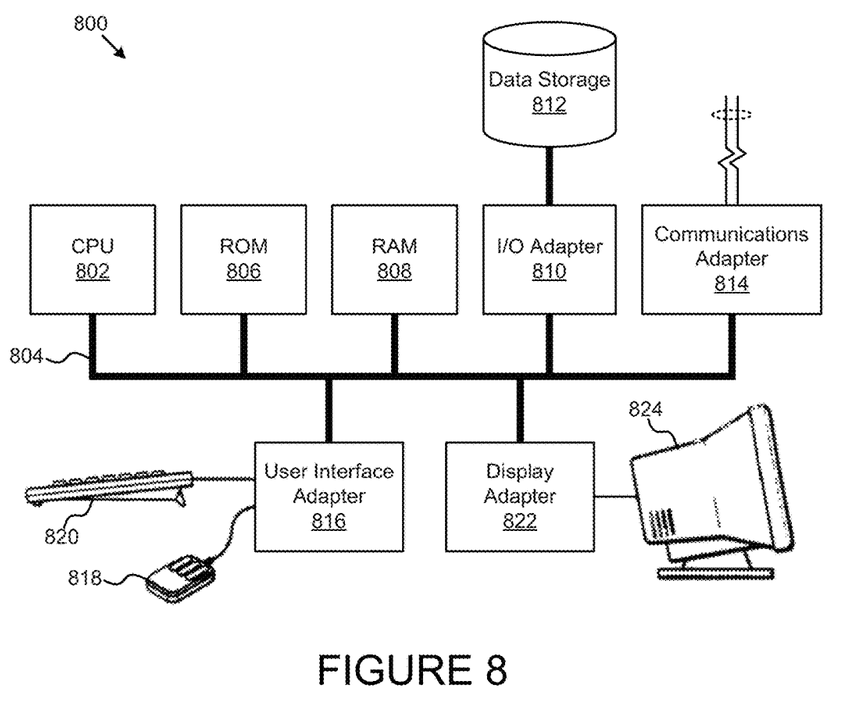
FIG. 8 is a block diagram illustrating a computer system according to one embodiment of the disclosure.

FIG. 8 illustrates a computer system 800 adapted according to certain embodiments of the server 702 and/or the user interface device 710. The central processing unit ("CPU") 802 is coupled to the system bus 804. Although only a single CPU is shown, multiple CPUs may be present. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 may also include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an input/output (I/O) adapter 810, a communications adapter 814, a user interface adapter 816, and a display adapter 822. The I/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The user interface adapter 816 couples user input devices, such as a keyboard 820, a pointing device 818, and/or a touch screen (not shown) to the computer system 800. The keyboard 820 may be an on-screen keyboard displayed on a touch panel. The display adapter 822 may be driven by the CPU 802 to control the display on the display device 824. Any of the devices 802-822 may be physical and/or logical.

The applications of the present disclosure are not limited to the architecture of computer system 800. Rather the computer system 800 is provided as an example of one type of computing device that may be adapted to perform the functions of the server 702 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. Additionally, the firmware and/or software may be executed by processors integrated with components described above.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   receiving, at a routings engine from an airline reservation system, a request for first airline routes between an origin and a destination based on specified route parameters;
   storing, by the routings engine, the request in a historical record of requests;
   fetching, by the routings engine, first airline routes matching the origin, the destination, and the specified route parameters; and
   pre-fetching, by the routings engine, second airline routes based, at least in part, on the historical record of requests, by:
      computing a weighted arithmetic mean for a day of the historical record of requests;
      determining an idle time of the routings engine during which a load of the routings engine is below a mean between the total weighted arithmetic mean and a lowest load, and
      pre-fetching during the determined idle time of the routings engine.

2. The method of claim 1, wherein the step of pre-fetching the second airline routes comprises pre-fetching the second airline routes at a scheduled time.

3. The method of claim 2, wherein the step of pre-fetching the second airline routes further comprises:
   identifying a frequency of requests in the historical record of requests;

retrieving schedule information based on the identified frequency; and determining a busy time of the routings engine during which a load of the routings engine is above a mean between a total weighted arithmetic mean and a highest load.

4. The method of claim 2, wherein the scheduled time is during a non-peak time range of the routings engine.

5. The method of claim 1, wherein the step of pre-fetching the airline routes comprises storing the airline routes in a cache.

6. The method of claim 5, wherein the step of fetching the airline routes comprises:

determining whether the cache stores a response to the request;

when the cache is determined to store a response to the request, fetch, by the routings engine, the first airlines routes from the cache; and when the cache is determined to not store a response to the request, fetch, by the routings engine, the first airlines routs from a database.

7. A computer program product, comprising:

a non-transitory computer readable medium comprising instructions that, when executed by a processor of a computing system, cause the processor to perform the steps of:

receiving, at a routings engine from an airline reservation system, a request for first airline routes between an origin and a destination based on specified route parameters;

storing, by the routings engine, the request in a historical record of requests;

fetching, by the routings engine, first airline routes matching the origin, the destination, and the specified route parameters; and pre-fetching, by the routings engine, second airline routes based, at least in part, on the historical record of requests by:

computing a weighted arithmetic mean for a day of the historical record of requests;

determining an idle time of the routings engine during which a load of the routings engine is below a mean between the total weighted arithmetic mean and a lowest load, and pre-fetching during the determined idle time of the routings engine.

8. The computer program product of claim 7, wherein the step of pre-fetching the second airline routes comprises pre-fetching the second airline routes at a scheduled time.

9. The computer program product of claim 8, wherein the step of pre-fetching the second airline routes further comprises:

identifying a frequency of requests in the historical record of requests;

retrieving schedule information based on the identified frequency; and determining a busy time of the routings engine during which a load of the routings engine is above a mean between a total weighted arithmetic mean and a highest load.

10. The computer program product of claim 8, wherein the scheduled time is during a non-peak time range of the routings engine.

11. The computer program product of claim 7, wherein the step of pre-fetching the airline routes comprises storing the airline routes in a cache.

12. The computer program product of claim 11, wherein the step of fetching the airline routes comprises:

determining whether the cache stores a response to the request;

when the cache is determined to store a response to the request, fetch, by the routings engine, the first airlines routes from the cache; and when the cache is determined to not store a response to the request, fetch, by the routings engine, the first airlines routs from a database.

13. An apparatus, comprising:

a memory;

a processor coupled to the memory, wherein the processor is further configured to perform the steps of:

receiving, at a routings engine from an airline reservation system, a request for first airline routes between an origin and a destination based on specified route parameters;

storing, by the routings engine, the request in a historical record of requests;

fetching, by the routings engine, first airline routes matching the origin, the destination, and the specified route parameters; and pre-fetching, by the routings engine, second airline routes based, at least in part, on the historical record of requests by:

computing a weighted arithmetic mean for a day of the historical record of requests;

determining an idle time of the routings engine during which a load of the routings engine is below a mean between the total weighted arithmetic mean and a lowest load, and pre-fetching during the determined idle time of the routings engine.

14. The apparatus of claim 13, wherein the step of pre-fetching the second airline routes comprises pre-fetching the second airline routes at a scheduled time.

15. The apparatus of claim 14, wherein the step of pre-fetching the second airline routes further comprises:

identifying a frequency of requests in the historical record of requests;

retrieving schedule information based on the identified frequency; and determining a busy time of the routings engine during which a load of the routings engine is above a mean between a total weighted arithmetic mean and a highest load.

16. The apparatus of claim 14, wherein the scheduled time is during a non-peak time range of the routings engine.

17. The apparatus of claim 13, wherein the step of pre-fetching the airline routes comprises storing the airline routes in a cache.

18. The apparatus of claim 17, wherein the step of fetching the airline routes comprises:

determining whether the cache stores a response to the request;

when the cache is determined to store a response to the request, fetch, by the routings engine, the first airlines routes from the cache; and when the cache is determined to not store a response to the request, fetch, by the routings engine, the first airlines routs from a database.

* * * * *